US011166249B2

(12) United States Patent
Lin et al.

(10) Patent No.: US 11,166,249 B2
(45) Date of Patent: Nov. 2, 2021

(54) METHOD AND APPARATUS FOR USING INDICATION INFORMATION OF TIME DOMAIN RESOURCE ALLOCATION

(71) Applicant: Telefonaktiebolaget LM Ericsson (publ), Stockholm (SE)

(72) Inventors: Zhipeng Lin, Nanjing (CN); Jingya Li, Gothenburg (SE); Jianwei Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/466,839

(22) PCT Filed: Mar. 7, 2019

(86) PCT No.: PCT/CN2019/077296
§ 371 (c)(1),
(2) Date: Jun. 5, 2019

(87) PCT Pub. No.: WO2019/184675
PCT Pub. Date: Oct. 30, 2019

(65) Prior Publication Data
US 2020/0120624 A1 Apr. 16, 2020

(30) Foreign Application Priority Data

Mar. 28, 2018 (WO) ............... PCT/CN2018/080961
May 23, 2018 (WO) ............... PCT/CN2018/088102

(51) Int. Cl.
*H04W 56/00* (2009.01)
*H04W 72/04* (2009.01)

(52) U.S. Cl.
CPC ....... *H04W 56/001* (2013.01); *H04W 72/042* (2013.01); *H04W 72/0446* (2013.01); *H04W 72/0493* (2013.01)

(58) Field of Classification Search
CPC ............. H04W 56/001; H04W 72/042; H04W 72/0446; H04W 72/0493; H04W 56/00
See application file for complete search history.

(56) References Cited

U.S. PATENT DOCUMENTS 10,506,588 B2* 12/2019 Kim ...................... H04W 48/12
2010/0260138 A1 10/2010 Liu et al.
(Continued)

FOREIGN PATENT DOCUMENTS

CN 107567698 A 1/2018
KR 101794055 B1 11/2017

OTHER PUBLICATIONS

3GPP, "3rd Generation Partnership Project; Technical Specification Group Radio Access Network; NR; Physical layer procedures for control (Release 15)", 3GPP TS 38.213 V15.0.0, Dec. 2017, pp. 1-56.

(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

Various embodiments of the present disclosure provide a method for using indication information of time domain resource allocation. The method comprises receiving indication information of time domain resource allocation from a network node by a terminal device. At least part of the indication information is allowed to at least partly indicate a communication configuration different from the time domain resource allocation. The method further comprises determining the communication configuration for the terminal device, based at least in part on the indication information.

8 Claims, 12 Drawing Sheets

(56) References Cited

U.S. PATENT DOCUMENTS

| | | | |
|---|---|---|---|
| 2016/0353478 A1 | 12/2016 | Kim | |
| 2018/0324022 A1* | 11/2018 | Sheng | H04L 5/0082 |
| 2019/0029012 A1* | 1/2019 | Wu | H04L 1/1861 |
| 2019/0068348 A1* | 2/2019 | Nam | H04L 5/0053 |
| 2019/0132066 A1* | 5/2019 | Park | H04W 36/0079 |
| 2019/0140776 A1* | 5/2019 | Seo | H04B 7/0456 |
| 2019/0159203 A1* | 5/2019 | Kim | H04L 5/00 |
| 2019/0200307 A1* | 6/2019 | Si | H04L 5/0048 |
| 2019/0239187 A1* | 8/2019 | Islam | H04W 68/02 |
| 2020/0120624 A1* | 4/2020 | Lin | H04W 56/00 |
| 2020/0187268 A1* | 6/2020 | Huang | H04L 5/0007 |
| 2020/0280945 A1* | 9/2020 | Tiirola | H04W 56/0015 |
| 2020/0281018 A1* | 9/2020 | Li | H04L 5/0051 |

OTHER PUBLICATIONS

Unknown, Author, "On Remaining System Information Delivery", 3GPP TSG-RAN WG1 NR AH #18-01, R1-1800804, Nokia, Nokia Shanghai Bell, Vancouver, Canada, Jan. 22-26, 2018, 13 pages.

Unknown, Author, "Remaining System Information Delivery Consideration", 3GPP TSG RAN WG1 Meeting #92, R1-1802811, Qualcomm Incorporated, Athens, Greece, Feb. 26-Mar. 2, 2018, 5 pages.

Unknown, Author, "Summary of Offline Discussion on RMSI", 3GPP TSG RAN WG1 Meeting AH 1801, R1-1801083, Catt, Vancouver, Canada, Jan. 22-26, 2018, 43 pages.

* cited by examiner

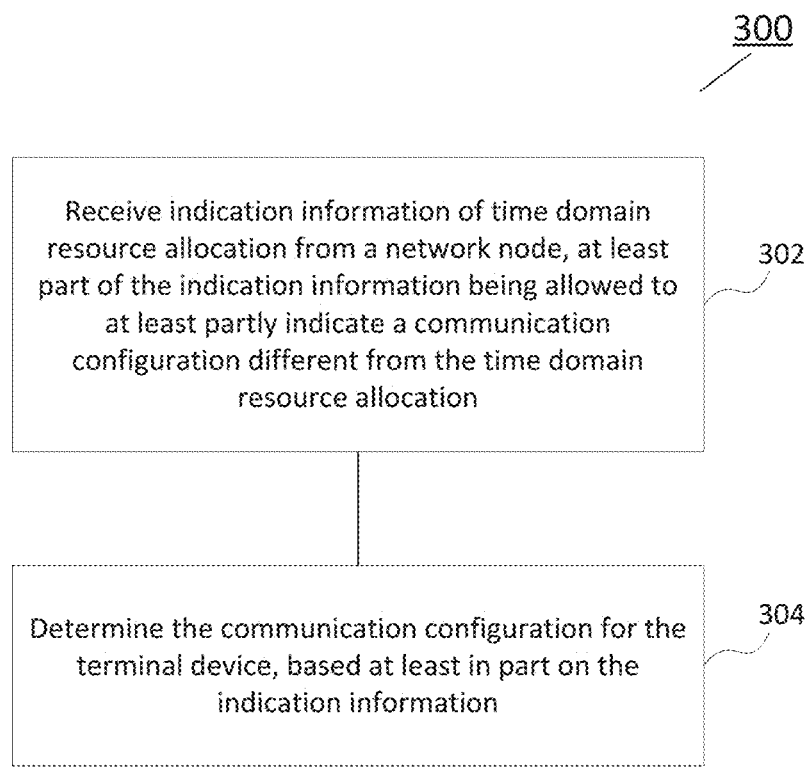
Fig.3
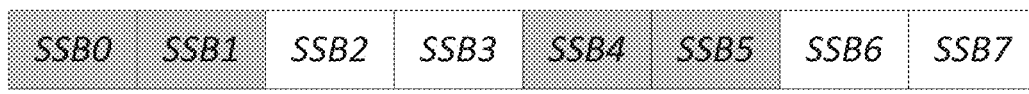
Fig.4A
| SSB-Periodicity Value | 0 | 1 | 2 | 3 | 4 | 5 |
|---|---|---|---|---|---|---|
| SS Burst Set Periodicity (ms) | 5 | 10 | 20 | 40 | 80 | 160 |
Fig.4B

METHOD AND APPARATUS FOR USING INDICATION INFORMATION OF TIME DOMAIN RESOURCE ALLOCATION

FIELD OF THE INVENTION

The present disclosure generally relates to communication networks, and more specifically, to usage on control information in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, a terminal device may be connected to different wireless communication networks, such as a long term evolution (LTE)/fourth generation (4G) network or a new radio (NR)/fifth generation (5G) network, to obtain multiple types of services. In order to connect to a network, a terminal device may need to acquire network synchronization and obtain essential system information (SI). For example, the terminal device can get SI in a master information block (MIB) and remaining minimum system information (RMSI). Synchronization signals may be used for adjusting the operating frequency of the terminal device relative to the network, and for finding proper timing of the received signal from the network. The radio resource and transmission configurations of the SI and synchronization signals may be informed to the terminal device by control information from the network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a NR/5G network may be able to support flexible network configuration. Various multiplexing types may be available for different signal transmissions from a network to a terminal device to enhance the utilization of radio resources in time and frequency domains. For example, there may be three multiplexing types between a RMSI control resource set (CORESET) with a synchronization signal and physical broadcast channel block (which is also known as a SS/PBCH block or a SSB for short). When resource configurations of the multiplexed signals are related to each other, the terminal device such as a user equipment (UE) can determine one resource configuration according to the other. In this case, some control information for indicating resource configurations from the network may be redundant or unnecessary for the terminal device. Therefore, there may be a need to utilize the control information about resource configurations in a communication network more efficiently.

Various embodiments of the present disclosure propose a solution of effective usage on control information in a communication network, which can enable a terminal device to obtain more useful information from a network node by utilizing some control information such as indication information of time domain resource allocation, so as to improve system performance and energy efficiency of the communication network.

According to a first aspect of the present disclosure, there is provided a method implemented at a terminal device. The method comprises receiving indication information of time domain resource allocation from a network node. According to some exemplary embodiments, at least part of the indication information may be allowed to at least partly indicate a communication configuration different from the time domain resource allocation. The method further comprises determining the communication configuration for the terminal device, based at least in part on the indication information.

According to a second aspect of the present disclosure, there is provided an apparatus implemented in a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus implemented in a terminal device. The apparatus comprises a receiving unit and a determining unit. In accordance with some exemplary embodiments, the receiving unit is operable to carry out at least the receiving step of the method according to the first aspect of the present disclosure. The determining unit is operable to carry out at least the determining step of the method according to the first aspect of the present disclosure.

According to a fifth aspect of the present disclosure, there is provided a method implemented at a network node. The method comprises determining indication information of time domain resource allocation for a terminal device. According to some exemplary embodiments, at least part of the indication information may be allowed to at least partly indicate a communication configuration different from the time domain resource allocation. The method further comprises transmitting the indication information to the terminal device.

According to a sixth aspect of the present disclosure, there is provided an apparatus implemented in a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus implemented in a network node. The apparatus comprises a determining unit and a transmitting unit. In accordance with some exemplary embodiments, the determining unit is operable to carry out at least the determining step of the method according to the fifth aspect of the present disclosure. The transmitting unit is operable to carry out at least the transmitting step of the method according to the fifth aspect of the present disclosure.

In accordance with an exemplary embodiment, the communication configuration may comprise a synchronization signal scheduling configuration.

In accordance with an exemplary embodiment, the at least part of the indication information may be reused or reserved to at least partly indicate the communication configuration.

In accordance with an exemplary embodiment, the synchronization signal scheduling configuration may indicate at least one of the following: one or more synchronization signal block groups, in each of which groups there are one or more synchronization signal blocks are transmitted from the network node to the terminal device; one or more synchronization signal blocks which are transmitted from the network node to the terminal device; and synchronization signal burst set periodicity.

In accordance with an exemplary embodiment, the at least part of the indication information may be used to indicate the communication configuration and the time domain resource allocation.

In accordance with an exemplary embodiment, the communication configuration such as the synchronization signal scheduling configuration may indicate one or more synchronization signal blocks which are not transmitted from the network node to the terminal device.

In accordance with an exemplary embodiment, the time domain resource allocation may be applied to a channel overlapping with one or more control resource sets for system information. The overlapped one or more control resource sets for system information may be associated with one or more synchronization signal blocks such as the synchronization signal block(s) which is not transmitted.

In accordance with an exemplary embodiment, the indication information may be a part of downlink control information (DCI). In accordance with an exemplary embodiment, the indication information as a part of the DCI may be carried by a channel in a control resource set for system information.

In accordance with an exemplary embodiment, the at least part of the indication information may comprise one or more bits in a time domain resource allocation field of the DCI.

In accordance with an exemplary embodiment, the communication configuration may be indicated by the at least part of the indication. Information and one or more predefined indicators in the DCI.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

According to a seventeenth aspect of the present disclosure, there is provided a method implemented at a terminal device. The method comprises receiving indication information of time domain resource allocation from a network node, wherein at least part of the indication information is allowed to at least partly indicate a communication configuration different from the time domain resource allocation or indicate a communication configuration for both the time domain resource allocation and other information; and determining the communication configuration for the terminal device, based at least in part on the indication information.

According to an eighteenth aspect of the present disclosure, there is provided a method implemented at a network node. The method comprises determining indication information of time domain resource allocation for a terminal device, wherein at least part of the indication information is allowed to at least partly indicate a communication configuration different from the time domain resource allocation or indicate a communication configuration for both the time domain resource allocation and other information; and transmitting the indication information to the terminal device.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 3 is a flowchart illustrating a method according to some embodiments of the present disclosure;

FIG. 4A is a diagram illustrating an example of reusing time domain resource allocation bits according to some embodiments of the present disclosure;

FIG. 4B is a diagram illustrating another example of reusing time domain resource allocation bits according to some embodiments of the present disclosure;

DETAILED DESCRIPTION

Figure 1A:
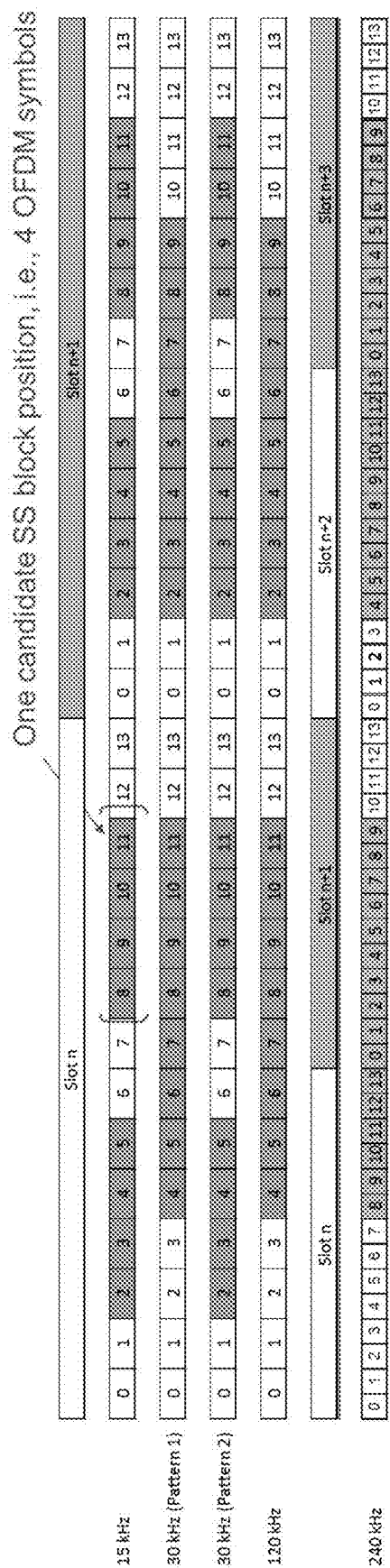
FIG. 1A is a diagram illustrating exemplary SSB mapping according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a wireless communication network, a terminal device may need to acquire network synchronization and obtain essential SI such as RMSI. In a wireless communication network such as NR, the synchronization and access procedure may involve several signals, for example, a primary synchronization signal (PSS) and a secondary synchronization signal (SSS).

The PSS may allow for network detection in the presence of a high initial frequency error, for example, up to tens of ppm. The SSS may allow for more accurate frequency adjustments and channel estimation while providing fundamental network information, such as a cell identifier (ID).

A physical broadcast channel (PBCH) may provide a subset of the minimum system information for random access and configurations for fetching remaining minimum system information in RMSI. It also may provide timing information within a cell, for example, to separate timing between beams transmitted from a cell. The amount of information to fit into the PBCH is of course highly limited to keep the size down. Furthermore, demodulation reference signals (DMRS) may be interleaved with PBCH resources in order to receive the PBCH properly.

A SS/PBCH block or SSB may comprise the above signals (such as PSS, SSS and DMRS) and PBCH. For example, the SSB may have 15 kHz, 30 kHz, 120 kHz or 240 kHz subcarrier spacing (SCS) depending on the frequency range.

FIG. 1A is a diagram illustrating exemplary SSB mapping according to some embodiments of the present disclosure. In FIG. 1A, each numbered small box represents an orthogonal frequency division multiplexing (OFDM) symbol, and dark symbols represent the mapping of candidate SSB positions at which SSB may be transmitted. As illustrated in FIG. 1A, one candidate SSB position may correspond to four OFDM symbols. FIG. 1A shows some exemplary candidate SSB positions within two slots for the cases of 15 kHz SCS, 30 kHz SCS (including pattern 1 and pattern 2) and 120 kHz SCS, and within four slots for the case of 240 kHz SCS.

Figure 1B:
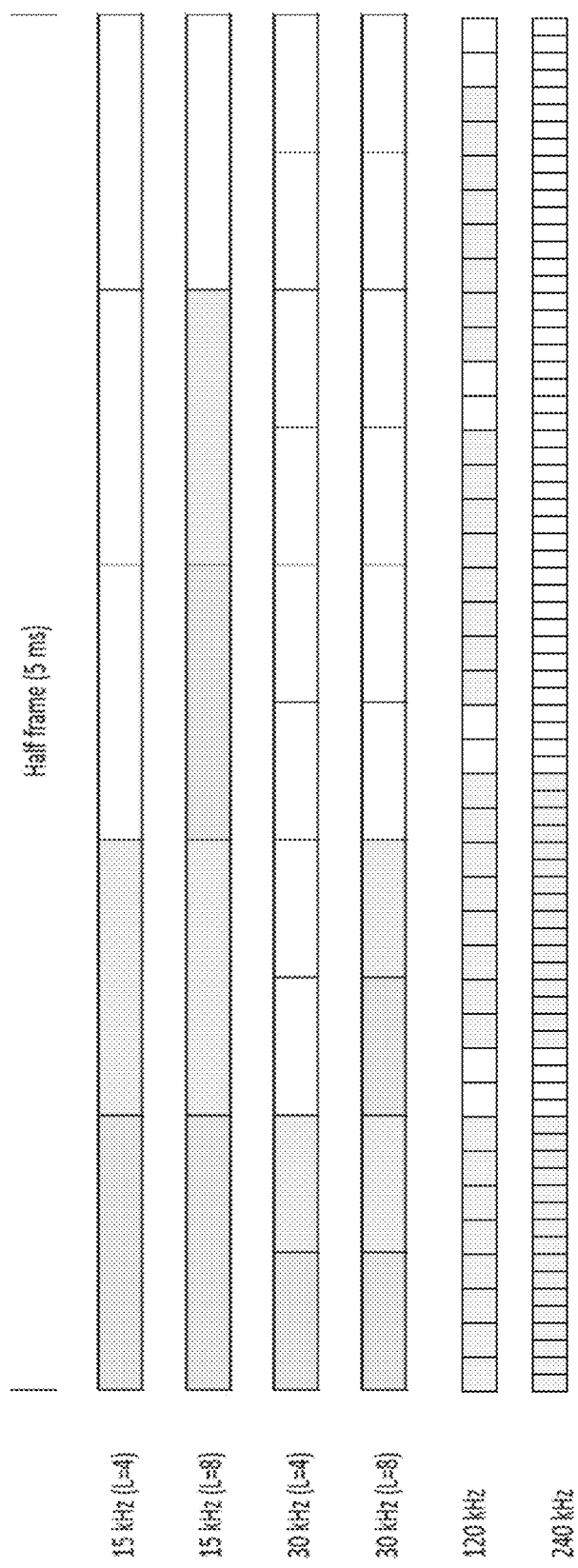
FIG. 1B is a diagram illustrating exemplary SS burst set mapping according to some embodiments of the present disclosure.

FIG. 1B is a diagram illustrating exemplary SS burst set mapping according to some embodiments of the present disclosure. In FIG. 1B, each box represents a slot, and the slots in each row constitute a half frame of 5 ms. According to the exemplary embodiment, a number of (typically rather close in time) SSBs constitute a SS burst set. As illustrated in FIG. 1B, for a SCS of 15 kHz with L=4 (where L is the maximum number of SSBs in a SS burst set), the first two slots may be used to transmit SSBs (for example, each slot for two SSBs), while the remaining three slots may not be used for SSB transmissions. Similarly, for a SCS of 15 kHz with L=8, the first four slots may be used to transmit SSBs, while the last slot may not be used for SSB transmissions.

FIG. 1B also shows SS burst set mapping to slots within 5 ms for other possible SCS numerologies or values, for example, 30 kHz SCS, 120 kHz SCS and 240 kHz SCS. The term "numerology" may be used to refer to some parameters related to the radio resources for signal transmissions, such as the SCS, the length or duration of a cyclic prefix (CP), the length or duration of an OFDM symbol, the number of symbols contained in a time slot, the time slot duration and/or the like.

According to an exemplary embodiment, a SS burst set may be transmitted periodically with the periodicity configured in RMSI. For example, 20 ms SS burst set periodicity may be assumed for initial access. By using the SSBs in the SS burst set, a UE can determine the downlink timing, frequency offset and/or the like, and acquire some fundamental system information from the PBCH. When the UE obtained downlink synchronization, it may know in which slots to expect SSB transmissions. Thus, the location of the SSB in a SS burst set may need to be provided to the UE to derive the subframe level synchronization.

In addition to network synchronization, some SI such as RMSI may also be important for a UE to connect to a network, RMSI may be carried in a physical downlink shared channel (PDSCH) scheduled by a physical downlink control channel (PDCCH) in the CORESET configured by a PBCH in NR. RMSI may contain the remaining subset of minimum system information, for example, the bitmap to indicate the actually transmitted SSBs.

The CORESET configured by the PBCH can also be used for other system information (OSI), paging, random access respond (RAR), and/or the like. In accordance with exemplary embodiments, the CORESET configured by the PBCH may consist of a number (denoted as $N_{RB}^{CORESET}$) of resource blocks in the frequency domain, and a number (denoted as $N_{symb}^{CORESET}$) of OFDM symbols in the time domain. For example, $N_{RB}^{CORESET}$ may be 24, 48 or 96, and $N_{symb}^{CORESET}$ may be 1, 2 or 3.

Figure 2:
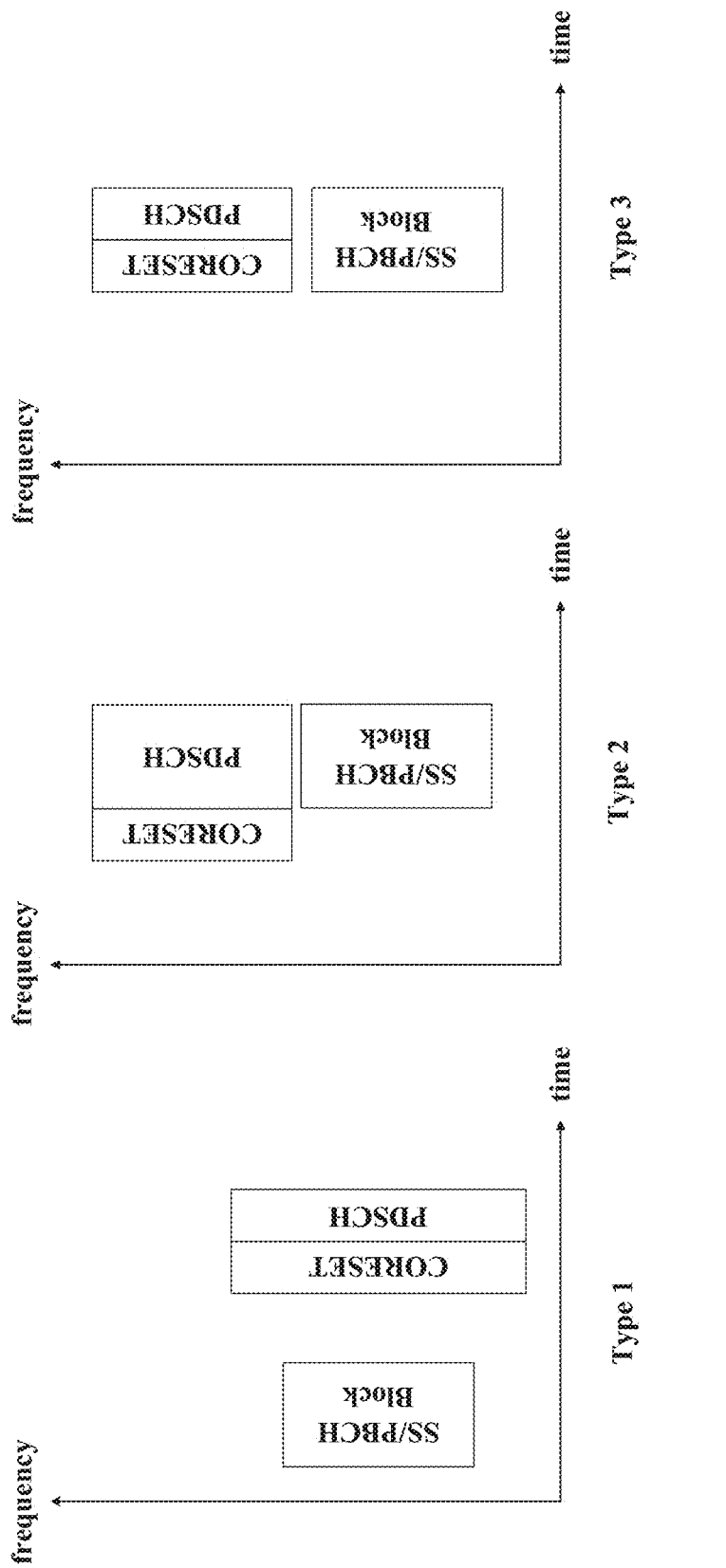
FIG. 2 is a diagram illustrating exemplary multiplexing types for SSB and RMSI CORESET according to some embodiments of the present disclosure.

After detecting one SSB, a LTE may try to search the possible PDCCH candidates based at least in part on the CORESET configurations if they are present in the PBCH. In accordance with exemplary embodiments, there may be several possible multiplexing types between the SSB and the CORESET configured by PBCH (also known as RMSI CORESET), FIG. 2 is a diagram illustrating exemplary multiplexing types for SSB and RMSI CORESET according to some embodiments of the present disclosure. As illustrated in FIG. 2, three multiplexing types (denoted as type 1, type 2 and type 3) may be applicable to the SSB and the RMSI CORESET in time domain and/or frequency domain. Among these multiplexing types, type 1 may be supported in sub-6 GHz and/or over-6 GHz frequency bands, while type 2 and type 3 are only supported in over-6 GHz frequency bands.

In accordance with exemplary embodiments, each multiplexing type may have a set of supported numerology combinations {SSB SCS, RMSI SCS}. For example, a set of numerology combinations {SSB SCS, RMSI SCS} supported by type 1 in sub-6 GHz frequency bands may comprise {15 kHz 5 kHz}, {15 kHz, 30 kHz}, {30 kHz, 15 kHz} and {30 kHz, 30 kHz}, and a set of numerology combinations {SSB SCS, RMSI SCS} supported by type 1 in over-6 GHz frequency bands may comprise {120 kHz, 60 kHz}, {120 kHz, 120 kHz}, {240 kHz, 60 kHz} and {240 kHz, 120 kHz}. Similarly, a set of numerology combinations {SSB SCS, RMSI SCS} supported by type 2 in over-6 GHz frequency hands may comprise {120 kHz, 60 kHz} and {240 kHz, 120 kHz}, and a set of numerology combinations {SSB SCS, RMSI SCS} supported by type 3 in over-6 GHz frequency bands may comprise {120 kHz, 120 kHz}.

In accordance with some exemplary embodiments, Type0-PDCCH common search space (C-SS) may be the search space used for RMSI/system information block 1 (SIB1) scheduling. The configuration of Type0-PDCCH C-SS is specified in Section 13, 3GPP TS 38.213. In addition, some PDCCH monitoring occasions and related configurations (such as monitoring periodicity, monitoring window, etc.) for type 1, type 2 and type 3 are also defined in 3GPP TS 38.213.

FIG. 2 also shows the relationship between bandwidth of a PDSCH and bandwidth of the CORESET containing the PDCCH scheduling this PDSCH. According to an exemplary embodiment, the initial active downlink (DL) bandwidth part (BWP) may be defined as the frequency location and bandwidth of RMSI CORESET and the numerology of RMSI. The PDSCH delivering RMSI may be confined within the initial active DL BWP. A UE can learn specific resource configurations (such as time domain and/or frequency domain resource allocation) from downlink control information (DCI). The DCI may be used for scheduling RMSI/OSI, for paging, random access, etc.

In accordance with an exemplary embodiment, the DCI size may be predefined and constant for all SSB and RMSI CORESET multiplexing types. For example, the DCI may have a format having the same size as the DCI format 1_0. The DCI carried by the PDCCH in the CORESET configured by the PBCH may comprise indication information of time domain resource allocation, for example, one or more bits to indicate the time domain resource allocation.

For different multiplexing types between SSB and RMSI CORESET, the total numbers of bits to indicate the time domain resource allocation may be different. If the PDSCH is assumed to be time aligned with the SSB for multiplexing type 2 and type 3, the time domain resource allocation bits may be not necessary. In addition, there may be different requirements on the number of time domain resource allocation bits in the DCI for different multiplexing types between SSB and RMSI CORESET. For example, the number of time domain resource allocation bits in DCI carried by the PDCCH RMSI CORESET for the case of multiplexing type 2 and type 3 would be less than that for the case of multiplexing type 1. On the other hand, in the case that the PDSCH is always scheduled to be time aligned with the associated SSB for multiplexing type 2 and type 3, it may pose a straight limitation to the time domain resource allocation flexibility. Therefore, it may be desirable to introduce an effective solution to configure and utilize indication information of time domain resource allocation more efficiently.

In the proposed solution according to some exemplary embodiments, a network node can provide a terminal device with indication information of time domain resource allocation. For various multiplexing types between SSB and RMSI CORESET, for example, the indication information such as one or more bits may be contained in a time domain resource allocation field in DCI carried by a PDCCH in RMSI CORESET. For a specified multiplexing type (e.g., multiplexing type 2 and/or type 3), some or all of the time domain resource allocation bits can be reused for other purposes than indicating the time domain resource allocation. Optionally, at least part of the time domain resource allocation bits can also be used together with one or more other indicators (for example, one or more reserved bits/code points, one or more bits/code points in use, etc.) in the DCI carried by the PDCCH in RMSI CORESET to indicate other information.

In accordance with some exemplary embodiments, the proposed solution may allow the scheduled PDSCH to overlap with RMSI CORESET or occupy at least a part of RMSI CORESET. Thus, one or more SSBs which are associated with the RMSI CORESET(s) overlapping with the scheduled PDSCH can be assumed not to be transmitted. In this case, the indication information of time domain resource allocation for the scheduled PDSCH also may be used to indicate the one or more SSBs which are not transmitted, in addition to indicating the time domain resource allocation of the scheduled PDSCH.

In this way, the flexibility of information configuration may be increased, and the terminal device can get more useful information from the network node more quickly. Accordingly, the system performance and the energy efficiency may be improved.

In a wireless communication network such as 5G/NR, UE-specific radio resource control (RRC) signaling with a full bitmap may be used to indicate the actually transmitted SSBs for both cases of sub-6 GHz and over-6 GHz frequency bands. Alternatively, the actually transmitted SSBs also may be indicated in the RMSI for both sub-6 GHz and over-6 GHz cases, where a full bitmap is used for the sub-6 GHz case while a group-bitmap (8 bits) plus a bitmap (8 bits) in a group are used for the over-6 GHz case.

In an exemplary embodiment where a group-bitmap (8 bits) plus a bitmap (8 bits) in a group are used to indicate the actually transmitted SSBs, a group is defined as consecutive SSBs. A bitmap in a group can indicate which SSB is actually transmitted within the group. Each group may have the same pattern of SSB transmission, and a group-bitmap can indicate which group is actually transmitted. For the case where the SSB and RMSI multiplexing type (such as type 2 or type 3) is used in frequency range 2 (FR2), the maximum number of SSBs in a SS burst set is 64. Correspondingly, 8 SSB groups and 8 SSB candidates in each SSB group may be defined for indication of actually transmitted SSBs in RMSI. Optionally, the indication of which subsets of SSB candidate positions have SSB(s) actually transmitted may be in compressed form in the over-6 GHz case.

In order to determine which set of SSBs are actually transmitted, a UE may have to get RMSI and/or RRC messages containing the bitmap of the actually transmitted SSBs. In addition, the UE may also need to know SS burst set periodicity according to RMSI and/or RRC messages. However, this may be time-consuming. For example, it is possible that the UE cannot get the RMSI and RRC messages to derive the SS burst set periodicity within a SS burst set period.

According to some exemplary embodiments, indication information of time domain resource allocation in the DCI carried by the PDCCH in RMSI CORESET may be reused to indicate which subsets of SSB candidate positions have SSB(s) actually transmitted. This can enable a UE to know which set of SSBs are actually transmitted before the UE gets the RMSI and RRC messages containing the bitmap of the actually transmitted SSBs. Alternatively or additionally, at least part of the indication information of time domain resource allocation may be used to indicate SS burst set periodicity, so that a UE can know the time duration of one SS burst set if the UE cannot get the SS burst set periodicity from the RMSI and RRC messages within a SS burst set period.

According to some exemplary embodiments, indication information of time domain resource allocation in DCI carried by a channel like PDCCH in a RMSI CORESET may be used to indicate both the time domain resource allocation and one or more SSBs which are not transmitted. The time domain resource allocation may be applied to a PDSCH scheduled by the PDCCH in the RMSI CORESET. According to the time domain resource allocation, the scheduled PDSCH may overlap with other RMSI CORESET(s). Since the RMSI CORESET(s) overlapping with the PDSCH may be associated with different SSBs, the UE may assume that the SSBs associated with the overlapped RMSI CORESET(s) are not transmitted. Therefore, the indication information of time domain resource allocation in DCI, such as 4 time domain resource allocation hits, also can be used as an indication of one or more SSBs which are not transmitted.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

FIG. 3 is a flowchart illustrating a method 300 according to some embodiments of the present disclosure. The method 300 illustrated in FIG. 3 may be performed by an apparatus implemented in a terminal device or communicatively coupled to a terminal device. In accordance with some exemplary embodiments, the terminal device such as a UE can support a PDSCH scheduled to be overlapped with a RMSI CORESET. Optionally, the terminal device can support various multiplexing types between SSB and RMSI CORESET, for example, multiplexing type 1, type 2 and type 3 as shown in FIG. 2. It will be appreciated that some embodiments of the present disclosure also may be applicable for other use cases, for example, multiplexing types between other different signal transmissions.

According to the exemplary method 300 illustrated in FIG. 3, the terminal device may receive indication information of time domain resource allocation from a network node, as shown in block 302. In accordance with some exemplary embodiments, at least part of the indication information may be allowed to at least partly indicate a communication configuration different from the time domain resource allocation. Alternatively or additionally, at least part of the indication information may be allowed to at least partly indicate a communication configuration for both the time domain resource allocation and other information such as one or more SSBs which are not transmitted.

In some exemplary embodiments, the at least part of the indication information may be reused or reserved for other purposes than indicating the time domain resource allocation. Optionally, in some exemplary embodiments, the at least part of the indication information may be utilized for other purposes in addition to indicating the time domain resource allocation.

In accordance with an exemplary embodiment, the indication information may be received as a part of DCI. For example, the DCI may be carried by a channel in a control resource set for system information. The DCI may comprise DCI carried by a PDCCH in RMSI CORESET, or other proper type of DCI. For example, the DCI may have one or more fields containing various parameters, indicators, etc.

In accordance with an exemplary embodiment, the at least part of the indication. Information may comprise one or more bits in a time domain resource allocation field of the DCI. It will be appreciated that the at least part of the indication information may also be included in the DCI in other suitable forms. For example, the at least part of the indication information in the time domain resource allocation field may form a new field of the DCI together with one or more bits in other field of the DCI.

In accordance with an exemplary embodiment, the communication configuration may be indicated by the at least part of the indication information and one or more predefined indicators in the DCI. For example, the predefined indicators may comprise one or more bits or code points which are in use or reserved. Optionally, the at least part of the indication information may be reused to indicate the communication configuration in combination with one or more valid or invalid bits in the DCI.

According to the exemplary method 300 illustrated in FIG. 3, the terminal device can determine the communication configuration based at least in part on the indication information, as shown in block 304. In accordance with an exemplary embodiment, the communication configuration may comprise a synchronization signal scheduling configuration. It will be appreciated that the communication configuration may also comprise other possible transmission scheduling and system configuration.

In accordance with an exemplary embodiment, the at least part of the indication information may be reused or reserved to at least partly indicate the communication configuration instead of the time domain resource allocation. In this case, the synchronization signal scheduling configuration may indicate at least one of the following: one or more synchronization signal block groups (such as SS/PBCH block groups), in each of which groups there are one or more synchronization signal blocks (such as SS/PBCH blocks) are transmitted from the network node to the terminal device; one or more synchronization signal blocks which are transmitted from the network node to the terminal device; and synchronization signal burst set periodicity.

In accordance with an exemplary embodiment, the at least part of the indication information may be used to indicate both the communication configuration and the time domain resource allocation. In this case, the communication configuration such as the synchronization signal scheduling configuration may indicate one or more synchronization signal blocks (such as SS/PBCH blocks) which are not transmitted from the network node to the terminal device. In this exemplary embodiment, the time domain resource allocation may be applied to a channel (such as PDSCH) overlapping with one or more control resource sets for system information (such as RMSI CORESET). The overlapped one or more control resource sets for system information may be associated with one or more synchronization signal blocks, such as the one or more synchronization signal blocks which are not transmitted. Optionally, the overlapped one or more control resource sets for system information may comprise at least one control resource set for system information subsequent to the control resource set for system information which contains a channel such as PDCCH scheduling the channel such as PDSCH.

FIG. 4A is a diagram illustrating an example of reusing time domain resource allocation bits according to some embodiments of the present disclosure. FIG. 4A shows a SSB group for FR2 when multiplexing type 2 and type 3 are used between SSB and RMSI CORESET. The SSB group may contain eight consecutive SSB candidates, which are denoted as SSB0, SSB1, SSB2, SSB3, SSB4, SSB5, SSB6 and SSB7. A SSB pair may be composed of two consecutive SSBs within the SSB group. Thus, there are four SSB pairs within the SSB group shown in FIG. 4A, which are denoted as {SSB0, SSB1}, {SSB2, SSB3}, {SSB4, SSB5} and {SSB6, SSB7}.

In this example, four bits (which are denoted as B0, B1, B2 and B3) in the time domain resource allocation field of DCI may be reused to define a bitmap to indicate possible positions at which there are one or more SSBs actually transmitted. For example, Bi=0 (where i=0, 1, 2 and 3) means that at least one SSB in a SSB pair {SSBj, SSB+1} (where j=2*i) is actually transmitted, while Bi=1 means that none of SSBs in a SSB pair {SSBj, SSBj+1} is actually transmitted. In this way, the four time domain resource allocation bits {B0, B1, B2, B3} can indicate which SSB pair in the SSB group has at least one SSB actually transmitted. It will be realized that the SSB pair shown in FIG. 4A is just an example, and the time domain resource allocation bits may also be used to indicate a SSB group which comprises more than two SSBs. Correspondingly, usage on time domain resource allocation bits for indicating which SSB group(s) has/have one or more SSBs actually transmitted may be adjusted adaptively.

Alternatively or additionally, some or all of the time domain resource allocation bits may be used together with other bits in DCI to indicate other information. For example, the combination of at least part of the time domain resource allocation bits with other bits in the DCI may be used to indicate which SSB in a SSB group is actually transmitted.

FIG. 4B is a diagram illustrating another example of reusing time domain resource allocation bits according to some embodiments of the present disclosure. FIG. 4B shows six possible values of SS burst set periodicity in a table, including 5 ms, 10 ms, 20 ms, 40 ms, 80 ms and 160 ms. These actual periodicity values may correspond to six predefined SSB-periodicity values 0, 1, 2, 3, 4 and 5, respectively. Thus, three bits in the time domain resource allocation field of DCI may be reused to indicate the six SSB-periodicity values. According to the three time domain resource allocation bits, a terminal device can know the time duration of one SS burst set, even though the terminal device cannot get the SS burst set periodicity from RMSI and RRC messages within a SS burst set period.

It will be appreciated that the usage on time domain resource allocation bits and the corresponding settings in FIGS. 4A-4B are just shown as examples, and various alternative usage approaches and parameter settings may be applicable to the communication between the terminal device and the network node according to the embodiments of the present disclosure.

Figure 5:
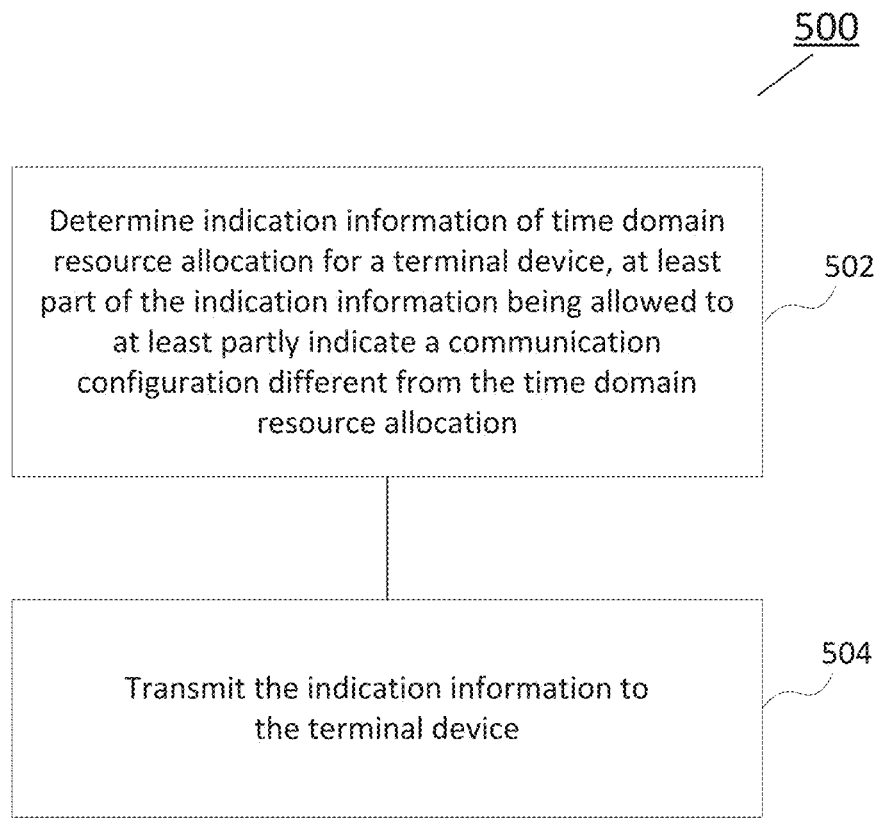
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by an apparatus implemented in a network node or communicatively coupled to a network node. In accordance with an exemplary embodiment, the network node such as a gNB can support a PDSCH scheduled to be overlapped with a RMSI CORESET. Optionally, the network node can support various multiplexing types between SSB and RMSI CORESET, for example, multiplexing type 1, type 2 and type 3 as shown in FIG. 2. It will be appreciated that multiplexing types between other different signal transmissions also may be applicable to communications of the network node according to some embodiments of the present disclosure.

According to the exemplary method 500 illustrated in FIG. 5, the network node can determine indication information of time domain resource allocation for a terminal device, as shown in block 502. In accordance with some exemplary embodiments, at least part of the indication information may be allowed to at least partly indicate a communication configuration different from the time domain resource allocation. Alternatively or additionally, at least part of the indication information may be allowed to at least partly indicate a communication configuration for both the time domain resource allocation and other information such as one or more SSBs which are not transmitted.

As described in connection with FIG. 3, the at least part of the indication information may comprise one or more bits in a time domain resource allocation field of DCI from the network node to the terminal device. In an exemplary embodiment, the indication information may be transmitted as a part of the DCI. For example, the DCI may be carried by a PDCCH in RMSI CORESET. Optionally, the number of bits in the time domain resource allocation field in the DCI may be the same or different for various multiplexing types between SSB and RMSI CORESET.

In accordance with some exemplary embodiments, the network node may transmit the indication information to the terminal device, as shown in block 504. According to some exemplary embodiments, the network node can inform the terminal device of the communication configuration different from the time domain resource allocation by using the indication information, optionally in combination with one or more other indicators and/or parameters. According to other exemplary embodiments, the network node can inform the terminal device of the communication configuration in addition to the time domain resource allocation by using the indication information. The communication configuration may comprise a synchronization signal scheduling configuration and/or other possible system configuration.

In accordance with an exemplary embodiment where at least part of the indication information is reused or reserved to indicate the synchronization signal scheduling configuration, the network node can inform at least one of the following to the terminal device: one or more SS/PBCH block groups, in each of which groups there are one or more SS/PBCH blocks are actually transmitted; one or more SS/PBCHs which are actually transmitted; and the SS burst set periodicity. Optionally, the network node may combine at least part of the indication information with one or more predefined indicators (such as bits and/or code points) in DCI to indicate one or more communication configurations, so as to provide more useful information to the terminal device in a shorter period of time.

In accordance with an exemplary embodiment where at least part of the indication information is used to indicate the communication configuration such as the synchronization signal scheduling configuration in addition to the time domain resource allocation, the network node can inform the terminal device of one or more synchronization signal blocks (such as SS/PBCH blocks) which are not transmitted from the network node to the terminal device. In this exemplary embodiment, the one or more synchronization signal blocks may be associated with one or more control resource sets for system information (such as RMSI CORE-SET) which overlap with a channel (such as PDSCH) related to the time domain resource allocation.

It will be realized that parameters, variables and settings related to the transmission scheduling and resource allocation described herein are just examples. Other suitable network settings, the associated configuration parameters and the specific values thereof may also be applicable to implement the proposed methods.

The proposed solution according to one or more exemplary embodiments can enable a network node (such as a gNB) to utilize some control information, for example, indication information of time domain resource allocation, to inform a terminal device (such as a UE) of network settings and scheduling configurations more efficiently. By applying the proposed solution according to the present disclosure, a UE can receive indication information which is used to indicate other configuration than or in addition to time domain resource allocation. For example, in the case that the actually transmitted SSB(s) and/or SSB periodicity is indicated to the UE in DCI before RMSI is correctly decoded, the UE's processing time can be reduced and the UE's power may be saved while the usage efficiency of DCI bits can be improved. It can be seen that taking the advantage of indication information of time domain resource allocation makes the gNB able to fully utilize radio resources and the UE able to fast access network services, so as to improve transmission performance and energy efficiency.

The various blocks shown in FIG. 3 and FIG. 5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
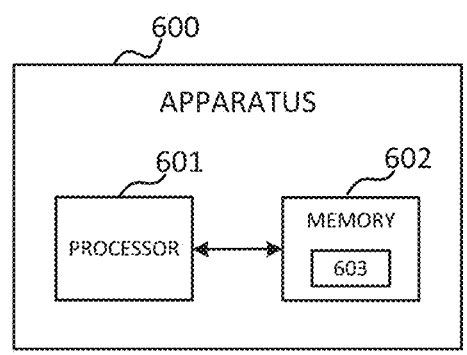
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a terminal device as described with respect to FIG. 3, or a network node as described with respect to FIG. 5.

In some implementations, the one or more memories 602 and the computer program codes 603 may be configured to, with the one or more processors 601, cause the apparatus 600 at least to perform any operation of the method as described in connection with FIG. 3. In other implementations, the one or more memories 602 and the computer program codes 603 may be configured to, with the one or more processors 601, cause the apparatus 600 at least to perform any operation of the method as described in connection with FIG. 5.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
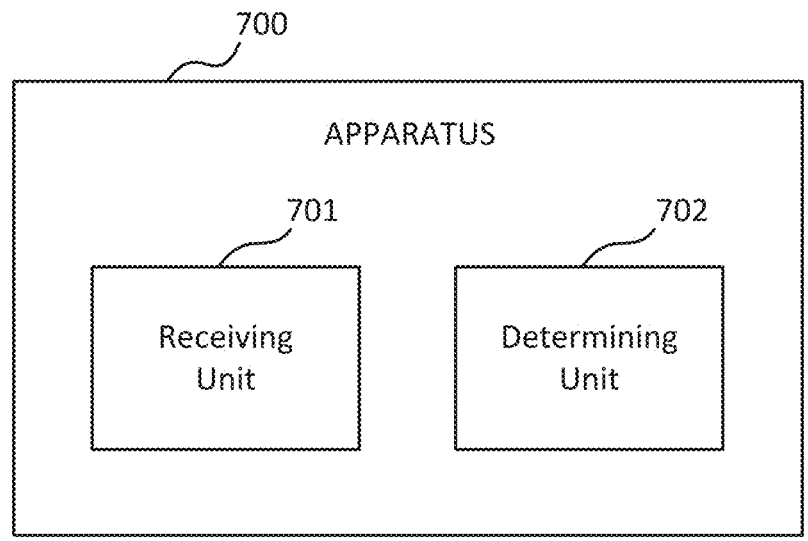
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a receiving unit 701 and a determining unit 702. In an exemplary embodiment, the apparatus 700 may be implemented in a terminal device such as a UE. The receiving unit 701 may be operable to carry out the operation in block 302, and the determining unit 702 may be operable to carry out the operation in block 304. Optionally, the receiving unit 701 and/or the determining unit 702 may be operable to carry out more or less operations to implement the proposed methods according to the exemplary embodiments of the present disclosure.

Figure 8:
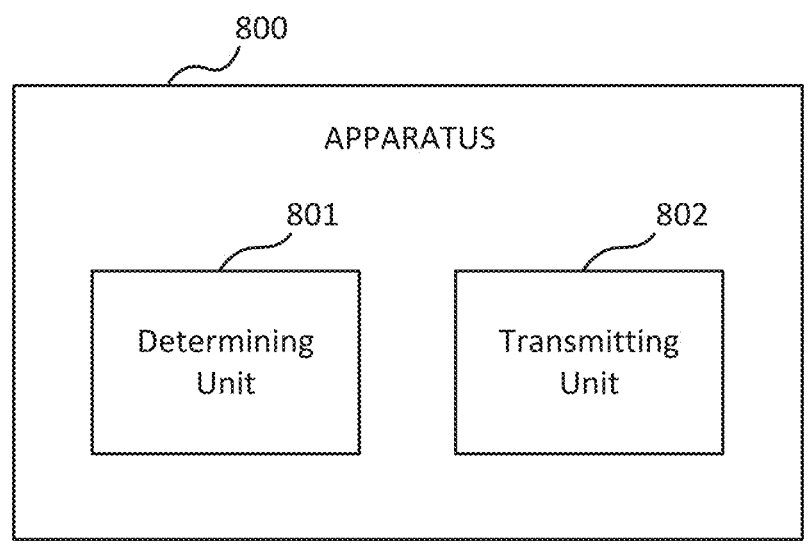
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a determining unit 801 and a transmitting unit 802. In an exemplary embodiment, the apparatus 800 may be implemented in a network node such as a gNB. The determining unit 801 may be operable to carry out the operation in block 502, and the transmitting unit 802 may be operable to carry out the operation in block 504. Optionally, the determining unit 801 and/or the transmitting unit 802 may be operable to carry out more or less operations to implement the proposed methods according to the exemplary embodiments of the present disclosure.

Figure 9:
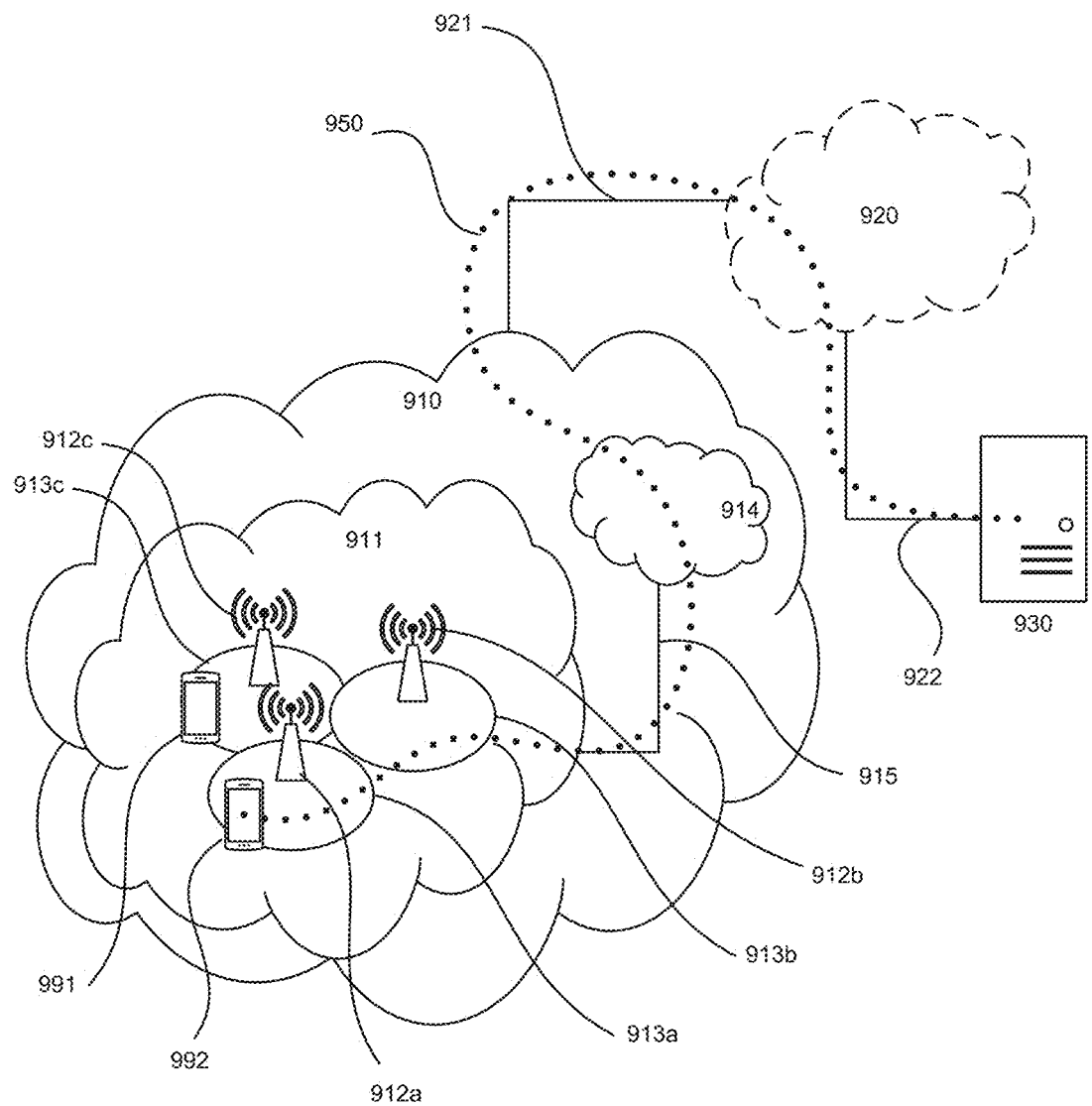
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
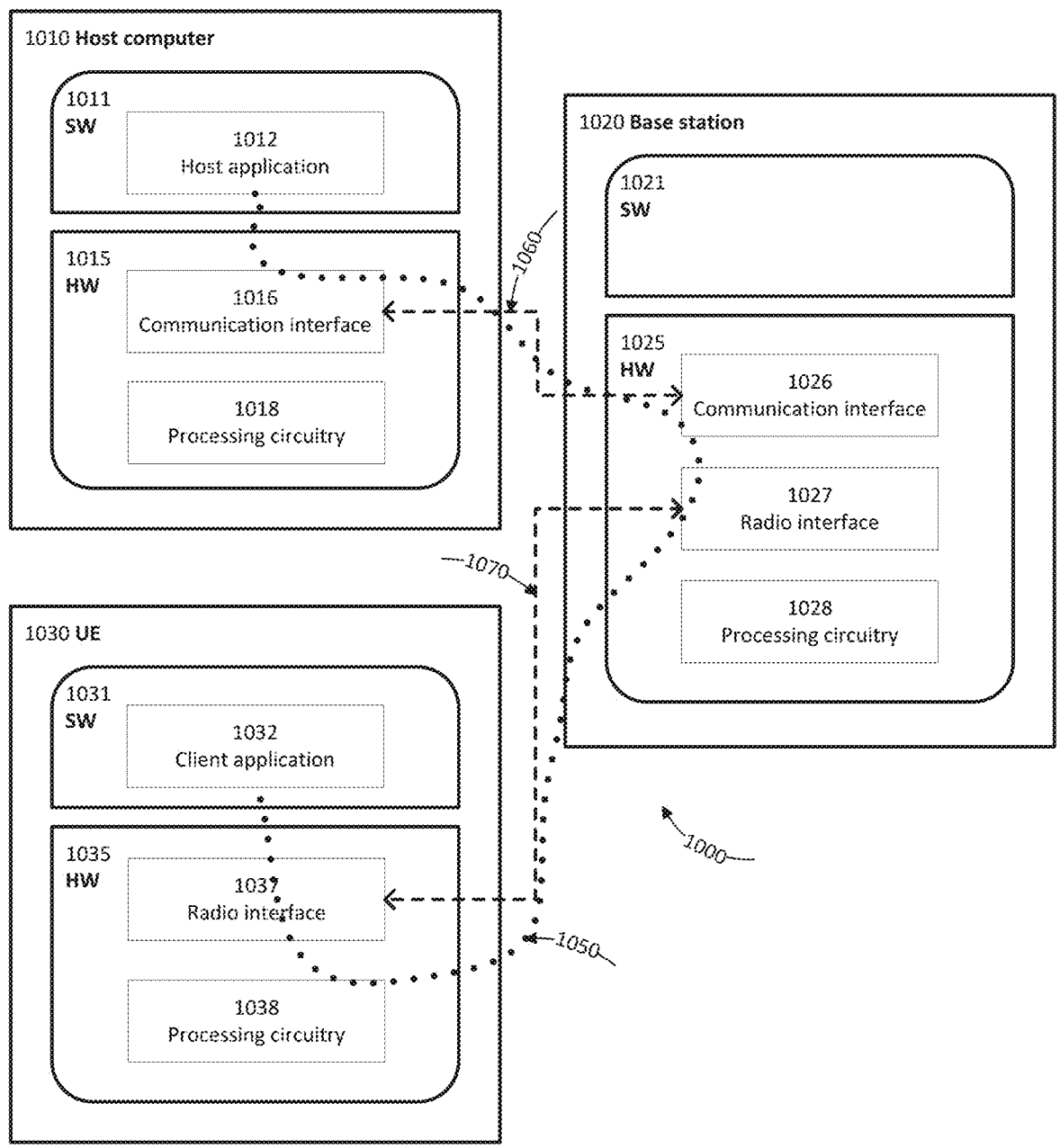
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
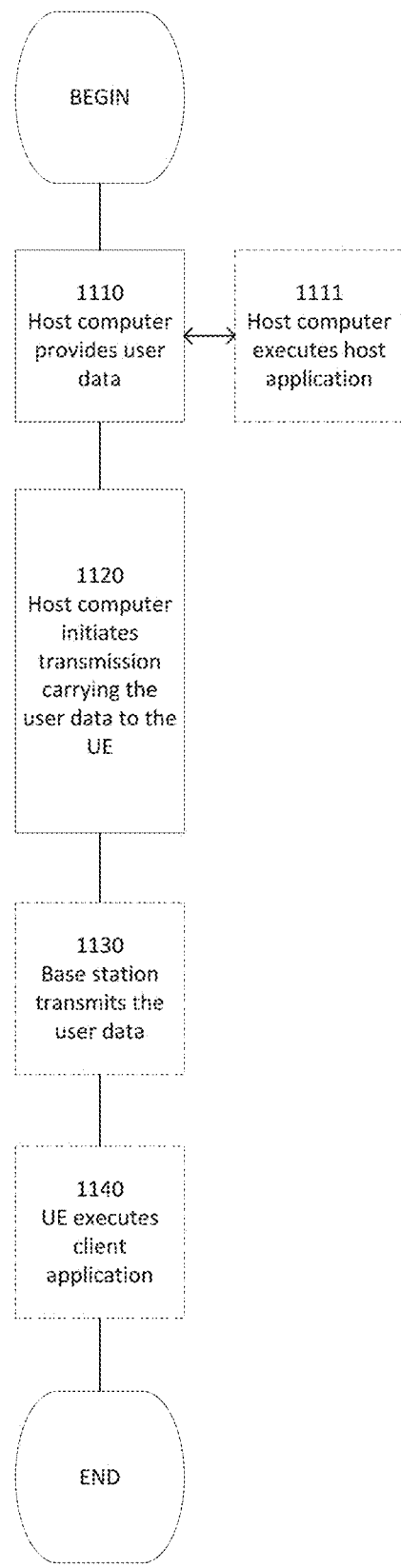
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
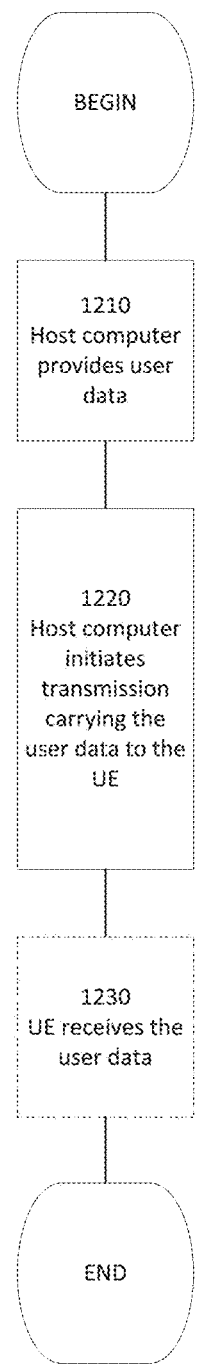
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
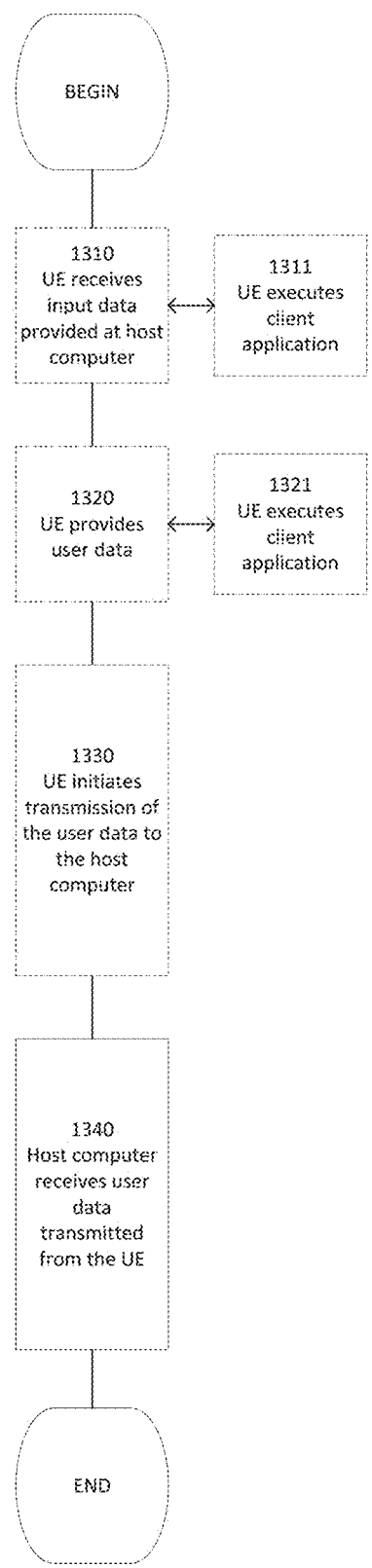
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
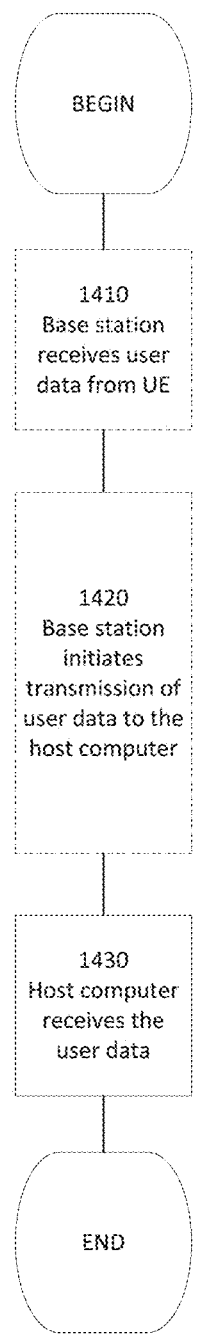
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied M whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a terminal device, comprising:
   receiving Downlink Control Information (DCI) from a network node, the DCI conveyed via a Physical Downlink Control Channel (PDCCH) in a control resource set (CORESET); and
   determining, based on time domain resource allocation in the DCI, that one or more synchronization signal blocks are not transmitted from the network node to the terminal device, when the one or more synchronization signal blocks are associated with the CORESET overlapping with a Physical Downlink Shared Channel (PDSCH) scheduled by the PDCCH, wherein the time domain resource allocation is applied to the PDSCH.

2. The method according to claim 1, wherein a portion of the time domain resource allocation in the DCI comprises synchronization signal scheduling configuration indicating the one or more synchronization signal blocks that are not transmitted, and wherein a further portion of the time domain resource allocation in the DCI indicates scheduling information for the PDSCH.

3. The method according to claim 2, wherein the synchronization signal scheduling configuration indicates at least one of the following:
   one or more synchronization signal block groups, wherein in each group there are one or more synchronization signal blocks that are transmitted from the network node to the terminal device;
   one or more synchronization signal blocks that are transmitted from the network node to the terminal device; and
   a synchronization signal burst set periodicity.

4. The method according to claim 1, wherein the time domain resource allocation comprises bits in a time domain resource allocation field of the downlink control information, and wherein one subset of the bits indicates the one or more synchronization signal blocks that are not transmitted and another subset of the bits indicates time domain resources for the PDSCH.

5. An apparatus implemented in a terminal device, comprising:
   one or more processors; and
   one or more memories comprising computer program codes,
   the one or more memories and the computer program codes configured to, upon execution by the one or more processors, cause the apparatus at least to:
   receive Downlink Control Information (DCI) from a network node, the DCI conveyed via a Physical Downlink Control Channel (PDCCH) in a control resource set (CORESET); and
   determine, based on time domain resource allocation in the DCI, that one or more synchronization signal blocks are not transmitted from the network node to the terminal device, when the one or more synchronization signal blocks are associated with the CORESET overlapping with a Physical Downlink Shared Channel (PDSCH) scheduled by the PDCCH, wherein the time domain resource allocation is applied to the PDSCH.

6. A method implemented at a network node, comprising:
   determining Downlink Control Information (DCI), the DCI conveyed via a Physical Downlink Control Channel (PDCCH) in a control resource set (CORESET), including setting time domain resource allocation in the DCI to indicate that one or more synchronization signal blocks are not transmitted from the network node for a terminal device, when the one or more synchronization signal blocks are associated with the CORESET overlapping with a Physical Downlink Shared Channel (PDSCH) scheduled by the PDCCH, wherein the time domain resource allocation is applied to the PDSCH; and
   transmitting the DCI to the terminal device.

7. The method according to claim 6, wherein a portion of the time domain resource allocation in the DCI comprises a synchronization signal scheduling configuration that indicates the one or more synchronization signal blocks that are not transmitted.

8. The method according to claim 6, wherein a further potion of the time domain resource allocation in the DCI indicates scheduling information for the PDSCH.

* * * * *

UNITED STATES PATENT AND TRADEMARK OFFICE
CERTIFICATE OF CORRECTION

PATENT NO. : 11,166,249 B2
APPLICATION NO. : 16/466839
DATED : November 2, 2021
INVENTOR(S) : Lin et al.

It is certified that error appears in the above-identified patent and that said Letters Patent is hereby corrected as shown below:

In the Specification

In Column 3, Line 50, delete "indication. Information" and insert -- indication information --, therefor.

In Column 8, Line 61, delete "respond" and insert -- response --, therefor.

In Column 9, Line 1, delete "LTE" and insert -- UE --, therefor.

In Column 9, Line 23, delete "{15 kHz 5 kHz}," and insert -- {15 kHz, 15 kHz}, --, therefor.

In Column 9, Line 30, delete "hands" and insert -- bands --, therefor.

In Column 10, Line 6, delete "PDCCH" and insert -- PDCCH in --, therefor.

In Column 12, Line 31, delete "indication. Information" and insert -- indication information --, therefor.

In Column 20, Line 45, delete "FIG. 11" and insert -- FIG. 14 will --, therefor.

In Column 21, Line 30, delete "M" and insert -- in --, therefor.

In the Claims

In Column 22, Line 62, in Claim 8, delete "potion" and insert -- portion --, therefor.

Signed and Sealed this
Seventeenth Day of May, 2022

Katherine Kelly Vidal
*Director of the United States Patent and Trademark Office*